United States Patent [19]

Liao

[11] 4,259,694
[45] Mar. 31, 1981

[54] ELECTRONIC RESCREEN TECHNIQUE FOR HALFTONE PICTURES

[75] Inventor: Henry H. Liao, Rocsmoor, Calif.

[73] Assignee: Xerox Corporation, Stamford, Conn.

[21] Appl. No.: 69,444

[22] Filed: Aug. 24, 1979

[51] Int. Cl.³ .............................................. H04N 1/40
[52] U.S. Cl. ................................................... 358/283
[58] Field of Search ................................ 356/432–435, 356/404; 250/559; 364/526, 525, 515; 358/283, 280, 284

[56] References Cited

U.S. PATENT DOCUMENTS

| | | | |
|---|---|---|---|
| 3,958,509 | 5/1976 | Murray et al. | 250/559 |
| 4,032,977 | 6/1977 | Liao | 358/280 |
| 4,084,196 | 4/1978 | Tisue et al. | 358/280 |
| 4,115,816 | 9/1978 | Moe et al. | 358/283 |
| 4,184,206 | 1/1980 | Harano | 358/280 |
| 4,196,452 | 4/1980 | Warren et al. | 364/515 |

OTHER PUBLICATIONS

Jarvis, J, et al., "A New Technique for Displaying Continuous Tone Images on a Bilevel Display", IEEE Transactions on Communications, vol. COM.-24, No. 8, pp. 891–898, Aug. 1976.

Schroeder, M. R., "Images from Computers", IEEE Spectrum, Mar. 1969, pp. 66–78.

*Primary Examiner*—John K. Corbin
*Assistant Examiner*—Bruce Y. Arnold
*Attorney, Agent, or Firm*—Robert E. Cunha

[57] ABSTRACT

A method for rescreening a halftone image to produce an edge-enhanced halftone copy from a halftone original. The halftone original is scanned by a raster input scanner and the resultant analog voltage is compared to a reference voltage to produce a one bit per pixel bit stream, where a pixel is defined as the smallest image (picture) element discernable by the system. For example, in a raster input scanner using a CCD array, the smallest picture element, pixel, is the analog voltage output of one CCD cell. This voltage subsequently can be converted to a digital gray scale representation requiring a plurality of bits per pixel, or either analog or digital representation can be compared to an analog or digital reference voltage to produce a one bit pixel. A six bit per pixel gray scale output is produced therefrom by adding an integrated value and an edge enhancement value for each input pixel received. The integrated value is calculated by summing the number of one bits in the seven by nine bit section surrounding each pixel. The edge enhancement value is calculated by determining the difference between the number of one bits in the right and left halves, and upper and lower halves, of the six by seven bit section surrounding each pixel. A set of equations is used to process these differences to produce an edge enhancement value which is added to the integrated value. From this six bit per pixel gray scale output the six bit output can be preserved, or a halftone copy can be produced by any well-known process. A simple and inexpensive circuit to perform the above functions at high data rates is also disclosed.

8 Claims, 15 Drawing Figures

FIG. 1A

ORIGINAL EDGE (IMAGE HIGHLIGHTS)

FIG. 1B

LOW PASSED EDGE

FIG. 1C

DETECTED EDGE

FIG. 1D

AFTER EDGE ENHANCEMENT

FIG. 2

N = SUM OF BLACK BITS IN 7 X 9 BOX

MODE    Y1(+d1y)

Y2(+d2y)

MODE    Y3(-d1y)

Y4(-d2y)

$$d1y = R_{2,3,4} - R_{5,6,7} \quad (4\text{-}4)$$

$$d2y = R_{1,2,3} - R_{4,5,6} \quad (4\text{-}5)$$

$$dy = \text{MAX}\,([d1y],[d2y]) \quad (4\text{-}6)$$

*FIG. 5*

| dx ≥ dy | X-Mode | Y-Mode | dxy | Action |
|---|---|---|---|---|
| | X1(+d1x,max) | Y1(+d1y,max) | d1 | N+dxy |
| | | Y4(-d2y,max) | d2 | N+dxy |
| | X2(+d2x,max) | Y2(+d2y,max) | d4 | N-dxy |
| | | Y3(-d1y,max) | d3 | N-dxy |
| | X3(-d1x,max) | Y2(+d2y,max) | d2 | N-dxy |
| | | Y3(-d1y,max) | d1 | N-dxy |
| | X4(-d2x,max) | Y1(+d1y,max) | d3 | N+dxy |
| | | Y4(-d2y,max) | d4 | N+dxy |

*FIG. 6*

| dy > dx | Y-mode | X-Mode | dxy | Action |
|---|---|---|---|---|
| | Y1(+d1y,max) | X1(+d1x,max) | d1 | N+dxy |
| | | X4(-d2x,max) | d3 | N+dxy |
| | Y2(+d2y,max) | X2(+d2x,max) | d4 | N-dxy |
| | | X3(-d1x,max) | d2 | N-dxy |
| | Y3(-d1y,max) | X2(+d2x,max) | d3 | N-dxy |
| | | X3(-d1x,max) | d1 | N-dxy |
| | Y4(-d2y,max) | X1(+d1x,max) | d2 | N+dxy |
| | | X4(-d2x,max) | d4 | N+dxy |

ELECTRONIC RESCREEN TECHNIQUE FOR HALFTONE PICTURES

BACKGROUND OF THE INVENTION

A frequent requirement in the copying, duplicating and printing industry is the reproduction of a continuous tone image, such as that produced through photography, on a printer which is incapable of reproducing gray colors. Newspaper printers and office copiers are the most common examples. A reasonable reproduction of gray scale originals can be accomplished through the process of halftoning. In this case, the copy comprises a matrix of black and white dots. The black dots are increased in size relative to the white dots to represent areas of darker gray while the size of the white dots are relatively increased to represent lighter shades of gray.

A more difficult problem occurs where the original itself is a halftone representation, rather than a photograph or equivalent. The production of a halftone copy from a halftone original usually results in a degraded copy since the original screen generates a large amount of non-informational content which, consequently, reacts with the copying process to produce Moire patterns, irregular shape and size of dots and a loss of texture and gray scale.

The most common method of improving the quality of reproduction from a halftone original is to filter out those screen frequencies that are produced by the halftoning process. The apparatus in raster scanning systems typically comprises a raster input scanner for converting the halftone original into an analog voltage, an analog filter to attenuate the high frequencies of the electrical signal, a halftone screener to convert the analog voltage into a halftone representation, and a printing engine to produce the hard copy. One problem with this system is that the filtering out of screen frequencies by a low pass filter also filters out most of the highlights and sharp edges that would otherwise have been reproduced in the copy. The result is a halftone reproduction that has an unfocused or washed-out look.

An alternative system converts the raster input scanner analog voltage into a digital representation, typically six bits or more per pixel where a pixel is defined as the smallest image (picture) element discernable by the system. For example, in a raster input scanner using a CCD array, the smallest picture element, pixel, is the analog voltage output of one CCD cell. This voltage subsequently can be converted to a digital gray scale representation requiring a plurality of bits per pixel, or either analog or digital representation can be compared to an analog or digital reference voltage to produce a one bit pixel. If a digital gray scale data stream is produced it may be operated on by some type of two dimensional digital filter to filter out the halftone screen frequencies. This process is time consuming and requires a relatively large amount of hardware since the digital representation of each pixel is typically multiplied by a weighting factor as part of the filtering process. The digital realization of low pass filtering also results in the loss of highlights and sharp edges.

What is required by the industry is a high speed method of reproducing halftone images which may be implemented in a relatively simple circuit and which would maintain a reasonable amount of detail in the copy.

SUMMARY OF THE INVENTION

The halftone rescreening method described herein comprises a raster input scanner which converts the halftone image into an analog voltage by any well known means. This voltage is then compared to a reference voltage to produce a one bit per pixel video signal which is used as the input to two paths of the rescreening circuit, a low pass filter path and an edge extraction path. The conversion of the input video into a one bit per pixel digital representation represents no more than a slight loss of information since the color values in the original are either black or white, and the scanning resolution is at least four times the halftone screen frequency. There may be a loss of information when the point being scanned is a transition point between a white and a black dot. In this case, the analog representation must be converted into a one bit black or white pixel. The pixels involved are few in number and are compensated for by a relatively large area of integration.

The low pass filter path is an area integrator which, in the described embodiment, sums the one and zero bits in a nine by seven bit area surrounding the pixel in question to yield a value of from zero to sixty-three, which is represented as a six bit word.

The edge extraction circuit uses a more complex algorithm which determines the rate at which a six by seven bit matrix surrounding the pixel in question is in an edge transition from white to black or black to white, and further determines whether this transition is occurring horizontally or vertically. This algorithm determines from these matrices the direction and rate of variation, and produces therefrom a five bit (plus sign) signal representing the direction and rate of change of the image edge.

The final step is to add the area integration output to the edge extraction output, resulting in a six bit per pixel signal varying from zero to sixty-three. This gray scale representation of the original now contains a minimum of Moire patterns, provides greater image detail and sharp edges and is in a form that can be fed to either a comparator device or a halftone screener of any kind to produce a hard copy. Because there is no weighting of gray scale information, as is required in the normal digital filtering process, the circuit required to implement this rescreening process is relatively simple and can be implemented to operate at high speeds. In addition, the resultant halftone copy is a reasonably faithful reproduction of the original having a minimum of Moire patterns and reasonable gray scale and edge sharpness.

DETAILED DESCRIPTION OF THE INVENTION

The theory of this invention may be most easily described in relation to the voltage waveshapes of FIGS. 1A through 1D. Waveshape 1A is a representation of the gray scale output that would result if an original continuous tone photograph were scanned by a raster-input-scanning type device as the raster moved across an abrupt transition between a light gray and a dark gray area. Assuming a full gray scale variation of from zero to sixty-three corresponding to a variation from white to black, waveshape 1A then is a waveshape of a gray scale transition from light gray to dark gray.

In terms of this invention the original is assumed to be a halftone original and there is the further assumption that the scanner output will be one bit per pixel. Therefore, the actual "original" signal will be one where the light gray portion of the FIG. 1A voltage has a predominance of white or zero pixels and where the darker portion has a predominance of one or black pixels. This one bit per pixel signal is applied to the circuit of FIG. 2.

Figure 1A:
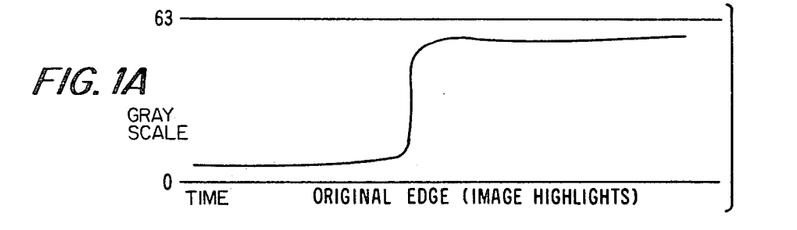
FIGS. 1A through 1D are waveshapes drawn to show clearly the effect of this edge enhancement process.
Figure 1B:
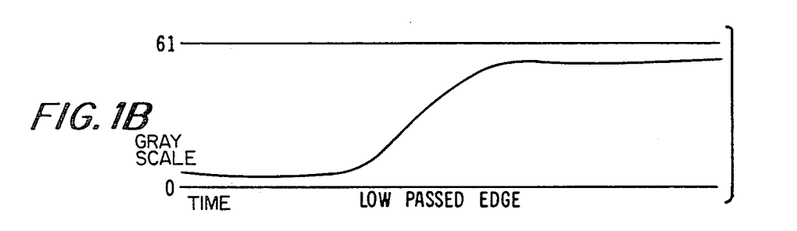
Figure 1C:
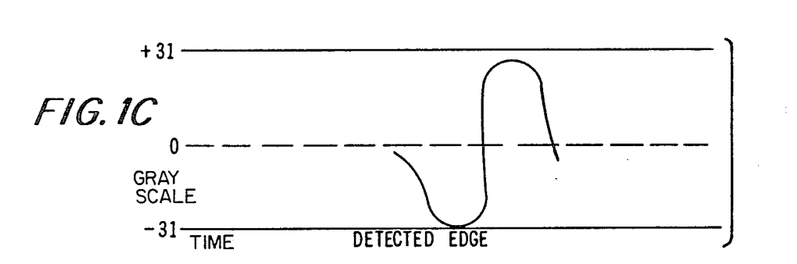
Figure 1D:
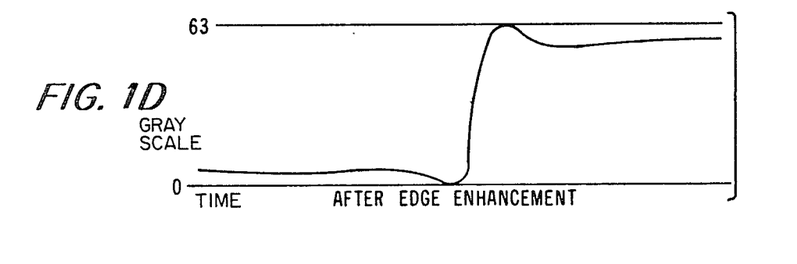
Figure 2:
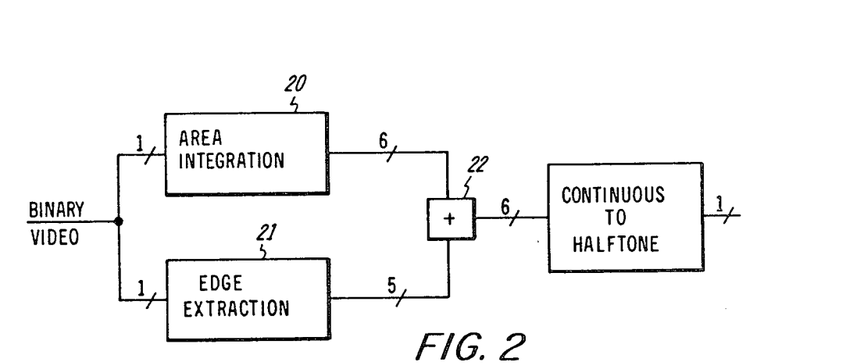
FIG. 2 is an overall block diagram of the rescreening system.

The area integrator 20 of FIG. 2 operates on the waveshape of the original edge 1A to produce the waveshape of a low-passed edge 1B. Simultaneously, the original edge 1A is applied to the edge extraction circuit 21 to produce the detected edge waveshape 1C. Finally, waveshapes 1B and 1C are added together in the summing junction 22 of FIG. 2 to produce an enhanced edge waveshape as shown in FIG. 1D.

The waveshapes of FIG. 1A through 1D are shown in analog form but are, in all cases, digital signals. As explained above, the original edge 1A is a one bit per pixel halftone representation of the original halftone image. FIG. 1B is a six bit digital representation of the image produced by the area integrator varying from zero to sixty-three. FIG. 1C is a series of five bits, including sign, per pixel representing the detected edge in a positive or negative direction, theoretically averaging zero. Finally, the FIG. 1D waveshape is the summation of waveshapes 1B and 1C and is represented as a series of six bit digital numbers varying from zero to sixty-three.

The summation of waveshapes 1B and 1C, as will be described below, may be a simple arithmetic addition, but it also may be a complex function. In any case, the result of the summation step is limited, as shown in FIG. 1D to a numerical value of between zero and sixty-three as shown. No significant loss of information results from this limitation since pure white or black image data will not be degraded by the limitation.

As shown in FIG. 2 the output of the summation junction 22 is a six bit per pixel gray scale representation and may be inverted to one bit per pixel, screened, or used directly in any well known printing process.

Figure 3:
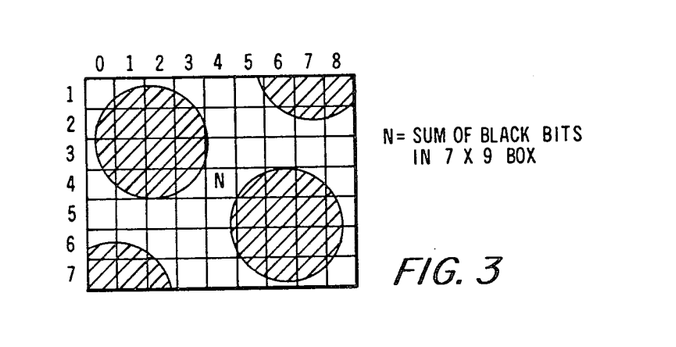
FIG. 3 is a typical seven by nine bit original image section.

FIG. 3 is a representation of the process by which the area integrator 20 calculates a value for each pixel. The value for each pixel, labeled N in FIG. 3, is determined by the simple counting of the "one" bits contained in the seven by nine bit area surrounding the pixel in question.

As shown in FIG. 3, this $7 \times 9$ bit area typically includes two white and two black halftone dots for a range of scanning and screening resolutions. To use the described embodiment as a numerical example, the raster input scanner produces 480 pixels per inch so that the image pattern shown in FIG. 3 would result from the scanning of a halftone original containing approximately 60 dots per inch horizontally. An area integrator works properly if the area includes at least two white and two black dots as shown in FIG. 3. Therefore, this particular embodiment will operate properly on halftone screens of approximately 60 dots per inch or more. On the other hand, halftone screens containing fewer than 60 dots per inch, and text, do not require rescreening. Thus, the numerical choices made for this embodiment are optimum for practical printing purposes.

Another advantage of the choice of a $7 \times 9$ bit matrix is that there are an odd number of bits in both directions to allow for the processing of a center pixel, and also that the sum of the bits contained within this matrix may be represented by an exact 6 bit binary number.

The area integrator simply adds the number of bits in the matrix, and couples it to the summing junction 22 of FIG. 2.

Figure 4:
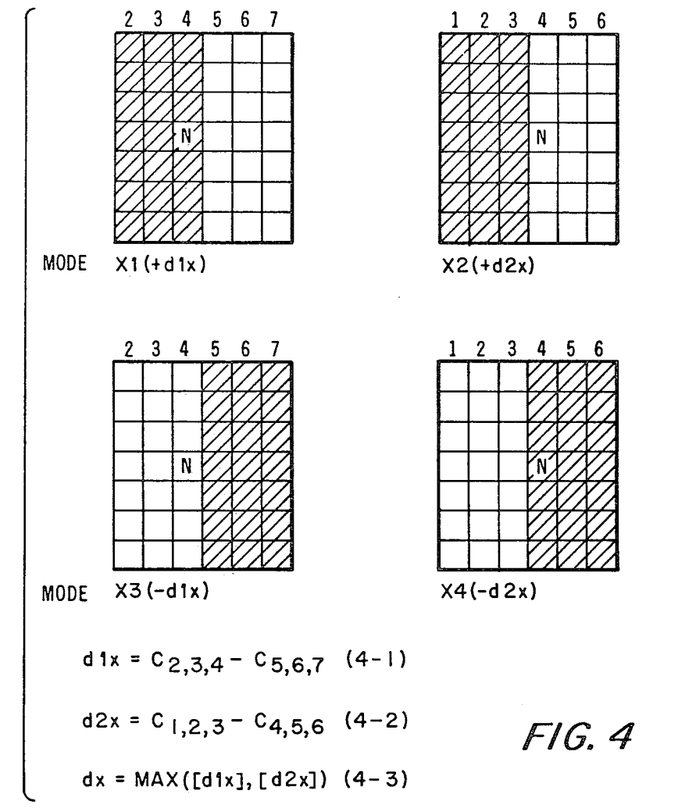
FIG. 4 shows the vertical edge calculations.
Figure 5:
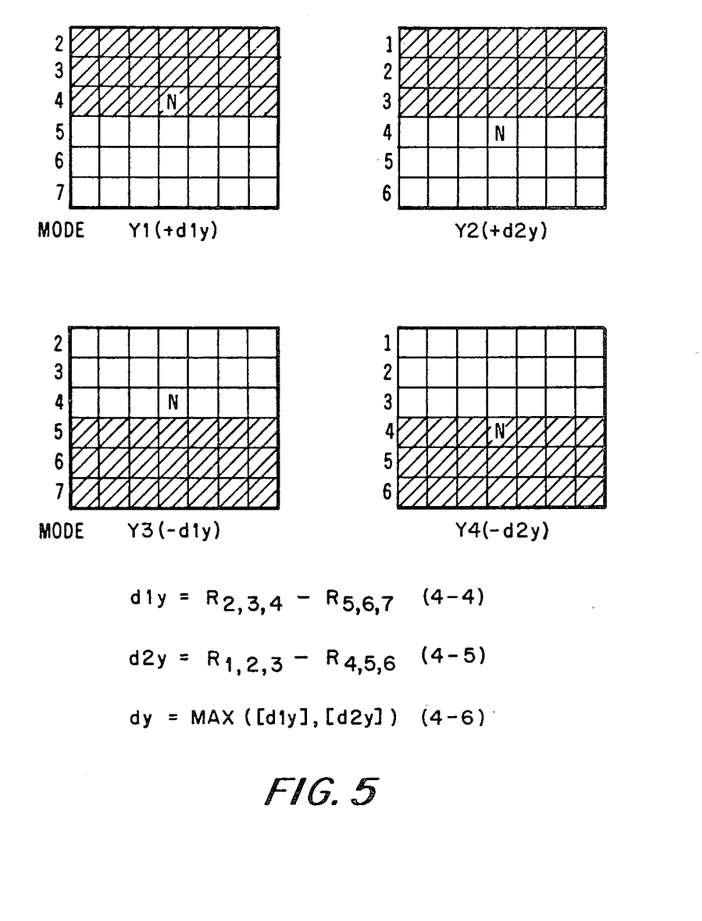
FIG. 5 shows the horizontal edge calculations.

The edge extraction circuit 21 of FIG. 2 operates according to the equations shown in FIGS. 4 and 5. The first operation is to determine whether the bit in question, N, is located at a vertical edge, is going from black to white or white to black, and to determine a numerical value of the rate of transition from black to white or white to black. This is done by generating a first set of intermediate values, d1x and d2x, as shown in FIG. 4.

The value of $C_{2,3,4} - C_{5,6,7}$ is computed by summing the number of black pixels in columns 2, 3, 4 or columns 5, 6 and 7, respectively, of FIG. 3. The particular sectons of the FIG. 3 matrix being operated on are shown in FIG. 4, the four possible modes labelled X1 through X4. The difference between modes X1 and X3 is that X1 will result in a positive number, showing a transition from black to white, while X3 will result in a negative number, showing a transition from white to black. In either case, d1x is defined as the sum of columns 2,3 and 4 minus the sum of columns 5,6 and 7 as shown in equation (4-1). Also, the absolute magnitude of the number will be an indication of the slope of the edge, corresponding to the slope of the rising edge of the waveshape in FIG. 1A. The calculation of d2x is similar to the calculation of d1x except that columns 1 through 6 of FIG. 3 are used instead of columns 2 through 7. The portions of the matrix of FIG. 3 being operated on to calculate d2x are shown as X2 and X4 and the equation used to calculate d2x is labeled (4-2). Finally, as shown in equation (4-3), a value, dx, is set equal to the larger of either the absolute value of d1x or the absolute value of d2x.

The magnitude and direction of the horizontal edge is computed similarly, as shown in Modes Y1 through Y4 and in equations (4-4) through (4-6).

At this point, it should be noticed that the results of equations (4-1) through (4-6) may or may not be contradictory. For instance, if the calculations show that pixel N is on the black side of a vertical edge as shown in Mode X1 and on the upper black side of a horizontal edge as shown in mode Y1 there is no contradiction, in either case a black edge correction will be added at pixel N. That is to say, in terms of FIG. 2, a black edge correction generated at the edge extraction block 21 will be added to the output of the area integrator 20. On the other hand, if the calculations show that the pixel in question, N, is on the white side of a vertical edge as shown in mode X2, but on the black side of a horizontal edge as shown in mode Y1, there is some question as to whether the correction for pixel N should be black or white. These alternatives have been provided for this embodiment using rules which will be explained below.

Figure 6:
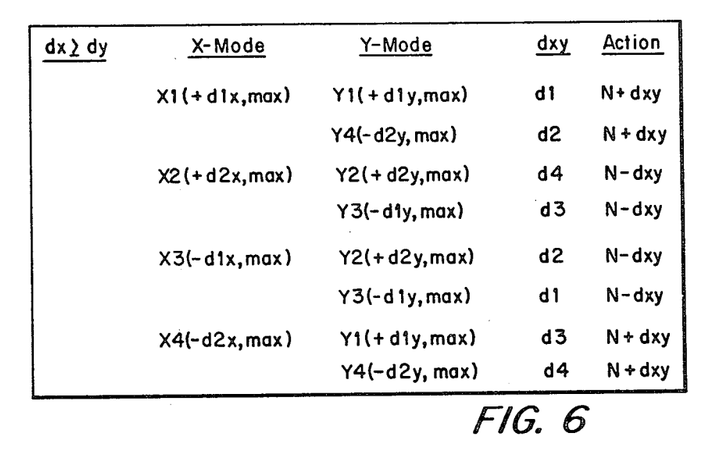
FIG. 6 is a matrix of computation to be used when the X mode predominates.
Figure 7:
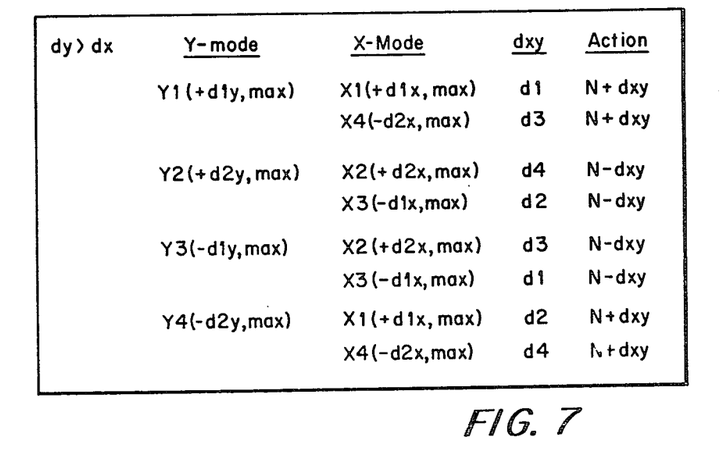
FIG. 7 is a matrix of computations to be used when the Y mode predominates.
Figure 8:
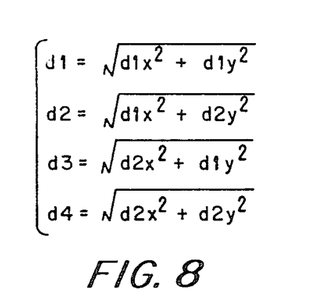
FIGS. 8 and 9 are a set of equations to determine mode selection.

After determining the numerical value of each mode (X1 through Y4) and the maximum X and Y modes (dx and dy), the equations of FIGS. 6, 7, and 8 can be used to compute the value of edge enhancement to be added to the final image.

If dx is greater than or equal to dy (if the absolute value of any one mode is greater than or equal to any of the Y modes absolute values) then the edge enhancement is computed as shown in FIG. 6.

First the identity of the X mode with the highest value is selected. Let us assume that X1 is selected, narrowing the selection to the first two lines of FIG. 6. Next, the values of Y1 and Y4 are inspected. At this point, it should be noted that the corrections of modes X1, Y1 and Y4 are non-contradictary. All of these modes result in a black edge enhancement. In other words, the edge enhancement algorithm described herein ignores contradictary corrections. To continue with the example, assume the value of Y1 is greater than Y4. Then the first line of FIG. 6 is selected. The final computation becomes N (the integrated area)+dxy where dxy=d1.

If, initially, dy is smaller than dx, the table of FIG. 7 would be used in similar fashion. In all cases, the results is the addition or subtraction of a correction value (d1 through d4) to N. Finally, these d1 to d4 values are computed as shown in FIG. 8. The computed value is only a rough guideline for edge enhancement. The actual edge correction value can be determined empirically and stored in the PROM.

Figure 9:
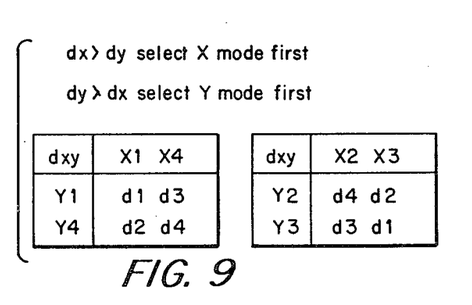

FIG. 9 is a shortened summary of FIGS. 6 and 7, and shows which correction values (d1 through d4) will be used for the various modes.

Figure 10:
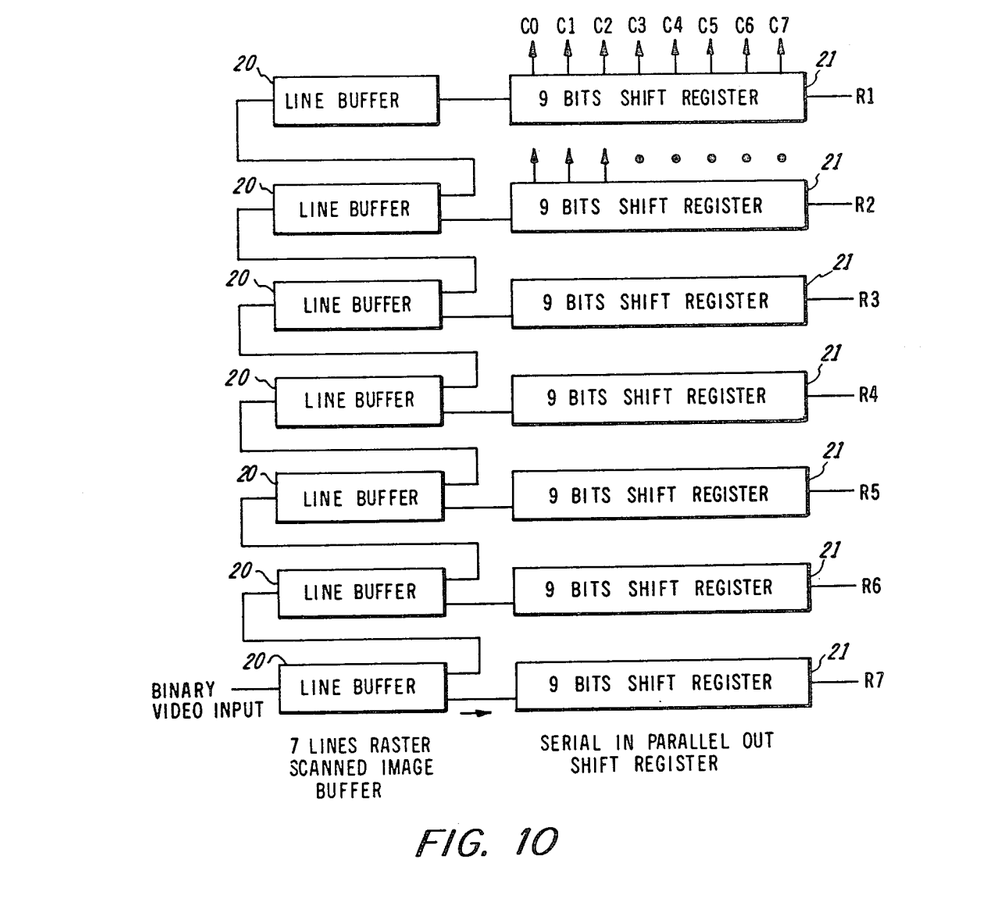
FIGS. 10, 11 and 12 are schematic diagrams of the circuit used.

FIG. 10 is a schematic of the line buffers 20 used to supply data to a bank of seven 9 bit shift registers 21. Each line buffer 20 contains 5280 or more bits, which is the contents of at least one entire eleven inch raster scan. Therefore, a total of seven raster scan lines are contained in the line buffers 20. As each bit is shifted into the first line buffer, a bit is clocked from each line buffer, into the next buffer and into each register 21. Thus, the contents of the entire bank of shift registers 21 is the data required by the matrices of FIGS. 3, 4 and 5. Each register 21 has nine output lines C0 through C8, to supply a seven by nine bit matrix of values to the remainder of the circuit.

Figure 11:
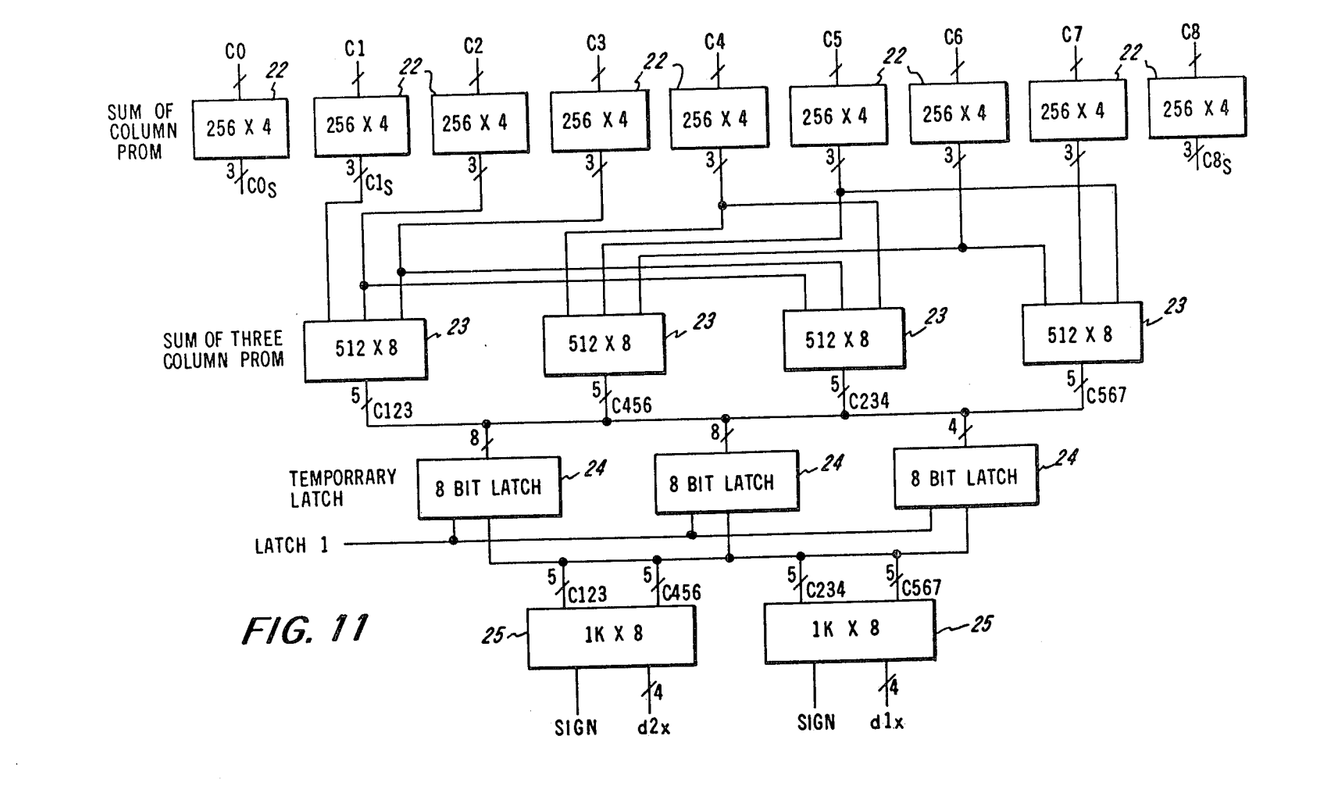

The edge enhancement value in the X (column) direction is calculated by the circuit of FIG. 11. An identical circuit, not shown, is used to calculate the Y (row) edge enhancement value.

Nine outputs, C0 through C8, from each of a total of seven shift registers 21 are coupled to nine ROMs 22 implemented as decoders to convert the number of bits, up to a maximum of seven, into the corresponding octal number. The outputs of these decoder ROMs are then used as address inputs to a second row of ROMs 23 which are implemented as adders to supply a total. As indicated in the figure, one ROM 23 is addressed to supply the C1, C2, C3 sum, the next supplies the C4, C5, C6 sum, etc. However, the 21 possible outputs of ROM 23 are represented by a 5 bit output. The resultant total of 20 bits from 4 ROMs is then latched into latches 24 prior to being input to ROMs 25 which are implemented as adders to compute either $C_{1,2,3}-C_{4,5,6}$ as in equation (4-2) or $C_{2,3,4}-C_{5,6,7}$ as in equation (4-1) of FIG. 6. The difference can be a maximum of 21 plus sign, which normally requires a six bit output. However, the 21 possible outputs are mapped to 16 outputs (plus sign) to allow each ROM 25 to have a five bit output for simple implementation. The 16 outputs represent the number of steps of extracted edge rather than the hexadecimal representation of 4 bits. The exact values of the edge steps is stored in ROM 33.

Figure 12:
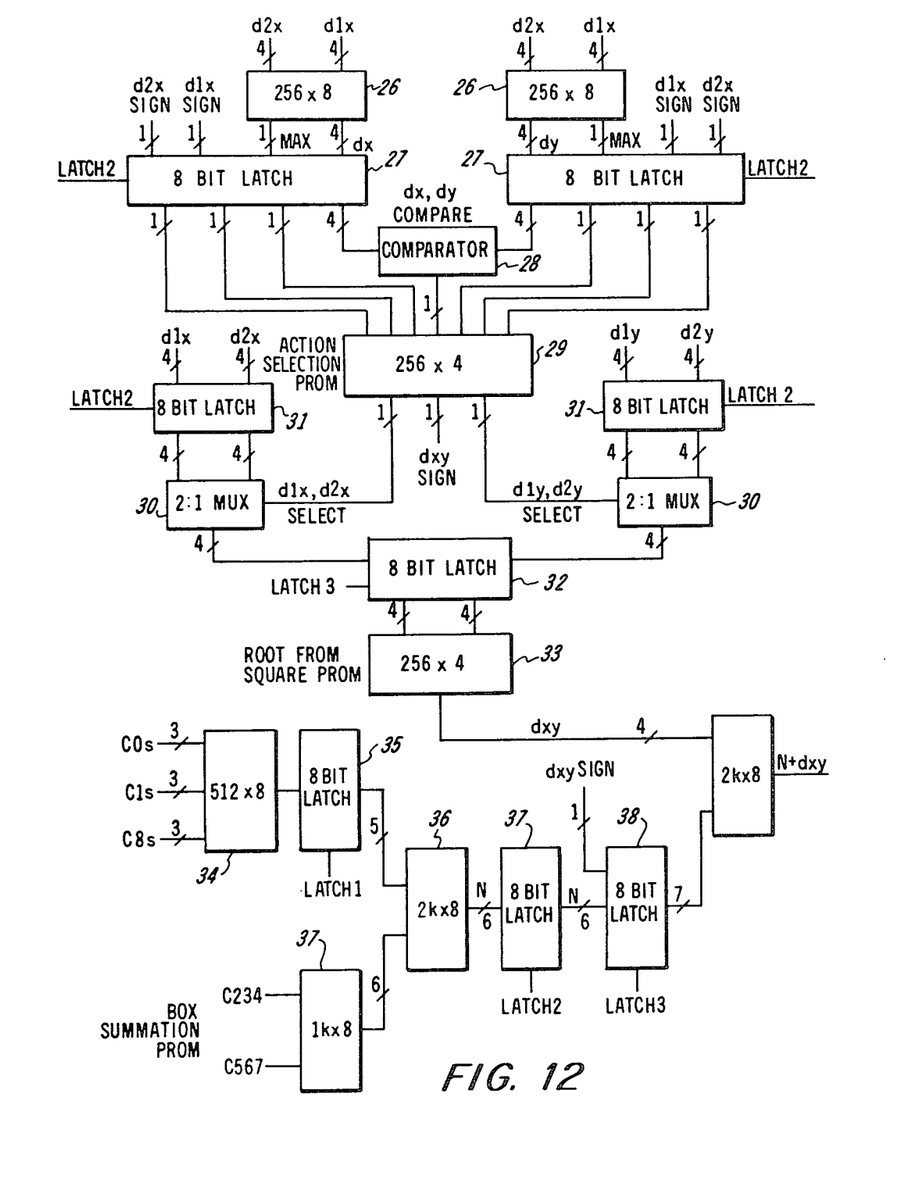

The remainder of the circuit is shown in FIG. 12. First ROMs 26 compare the absolute values of d2x to d1x and d2y to d1y, and in each case, select the larger. These two outputs are then latched through latches 27 and are compared at comparator 28, the output of which is a one bit flag indicating whether the X or Y value is larger.

ROMs 26 also determine whether the absolute value of d1x or d2x (and d2y or d1y) is larger and supply an indicating bit to latches 27. Finally, ROM 29 receives all four sign bits (d1x, d2x, d1y, d2y) from latches 27, bits indicating whether d1x or d2x (and d1y or d2y) is larger, and the bit from comparator 28 indicating whether the greatest absolute value is an X or Y value, and uses these to determine which line in the tables of FIGS. 6 and 7 to use for edge enhancement.

Specifically, the comparator 28 output determines whether the FIG. 6 or FIG. 7 table should be used, and within the appropriate table the max bits at the ROM 26 outputs, in conjunction with the two sign bits for each latch 27, narrow the choice to one line of the selected table.

The final step is to calculate the ultimate edge correction which is of the form $N \pm dxy$. First, ROM 29 controls each multiplexer 30 to couple the correct values of dx and dy from latches 31 through latch 32 to ROM 33. This ROM 33 is implemented to calculate the root mean square, accomplishing the selected calculation of FIG. 8.

To compute N, the outputs of the C0, C1 and C8 ROMs 22 of FIG. 11 are added in ROM 34 to form a subtotal which is latched through latch 35 and added in ROM 36 to the output of ROM 37 which has added the $C_{2,3,4}$ and $C_{5,6,7}$ values, available at the output of FIG. 11 ROMs 23. The resultant output of ROM 36 is a value of N which is latched through latches 37 and 38 and to which is either added or subtracted the value of the dxy output from ROM 33. The sign of this operation is determined by the "dxy sign" output bit from ROM 29.

In these schematics, ROM devices are used for a variety of functions that could have been performed by other types of devices. For instance, the function of ROMs 22 could have been performed by encoders. Similarly, ALUs could have been used instead of ROMs 25 and memory devices used instead of buffers 20 and shift registers 21. However, in all cases, the operation of the circuit would remain unchanged in that the calculations of FIG. 7 would be performed in any case. ROMs have been selected for this embodiment because of the higher speed and lower cost of these devices.

The calculations described above may also be varied to improve the visual results. For example, the root mean square need not be limited to the exact mathematical value, but may be varied, by reprogramming the ROM to shade the output in any way to give a better ultimate copy, and also to eliminate small edge variations due to the halftone dots by zeroing out certain PROM locations. The various additions and subtractions may also be varied similarly. There is a significant advantage in the use of PROMs over ALUs, decoders, etc., since PROMs can be programmed at any point in the design cycle to "tune" the system to various input or output parameters. Decoders and ALUs can be made to vary their outputs only by costly circuit redesign.

The invention is not limited to any of the embodiments described above, but all changes and modifications thereof not constituting departures from the spirit and scope of the invention are intended to be covered by the following claims:

What is claimed is:

1. A rescreener circuit for converting one bit per pixel input image data into multiple bit per pixel gray scale output image data comprising:
   integrator means for summing the number of input bits of one state surrounding and including the instant input bit,
   an edge extraction means for determining an edge correction value by calculating the rate at which the input image bits surrounding and including the instant input bit are changing in color in the vertical and horizontal directons, and
   means for adding the sum produced by said integrator means and the value produced by said edge extraction means to produce said multiple bit per pixel gray scale output.

2. The apparatus of claim 1 wherein said edge extraction means comprises:
   first means for determining a first column difference, d1x, between the number of input bits of one state in columns 2,3, and 4, as compared with the number of bits of the same state in columns 5,6, and 7, of rows 1 through 7,
   second means for determining a first row difference, d1y, between the number of input bits of one state in rows 2, 3 and 4, as compared with the number of bits of the same state in rows 5,6, and 7, of columns 1 through 7,
   third means for determining a second column difference, d2x, between the number of input bits of one state in columns 1,2, and 3, as compared with the number of bits of the same state in columns 4,5, and 6, of rows 1 through 7,
   fourth means for determining a second row difference, d2y, between the number of input bits of one state in rows 1,2, and 3, as compared with the number of bits of the same state in rows 4,5, and 6, of columns 1 through 7,
   where the instant bit is defined as the center bit of a matrix of columns 0 through 8 and rows 1 through 7 of input bits, and
   means for computing said edge correction value as a function of d1x, d2x, d1y, and d2y.

3. The apparatus of claim 2 wherein said integrator means sums the number of input bits of one state in a seven row by nine column matrix surrounding the instant input pixel.

4. The apparatus of claim 2 wherein said means for computing determines the root mean square values of the following sets, d1x and d1y, d1x and d2y, d2x and d1y, and d2x and d2y, and determines said edge correction value as a function of said root mean square values.

5. A method of converting one bit per pixel input image data into multiple bit per pixel gray scale output image data, where the instant input bit is defined as the center bit of a matrix of columns 0 through 8 and rows 1 through 7 of input bits, comprising the steps of:
   summing the bits of one state in said matrix,
   first determining a first column difference, d1x, between the number of input bits of one state in columns 2,3, and 4, as compared with the number of bits of the same state in columns 5,6, and 7, of rows 1 through 7.
   second determining a first row difference, d1y between the number of input bits of one state in rows 2,3, and 4, as compared with the number of bits of the same state in rows 5,6, and 7, of columns 1 through 7,
   third determining a second column difference, d2x, between the number of input bits of one state in columns 1,2, and 3, as compared with the number of bits of the same state in columns 4,5, and 6, of rows 1 through 7,
   fourth determining a second row difference, d2y, between the number of input bits of one state in rows 1,2, and 3, as compared with the number of bits of the same state in rows 4,5, and 6, of columns 1 through 7,
   computing an edge correction value as a function of d1x, d2x, d1y, and d2y, and
   adding said sum of bits of one state and said edge correction.

6. A method of converting binary scanned image data into multiple level continuous tone data comprising the steps of:
   first producing an integrated value of the color of a first area immediately surrounding each input pixel by summing the values of the binary input pixels,
   second producing an edge enhancement value of the rate of change in color in the horizontal and vertical directions by determining the difference in the number of white pixels in the left as compared with the right, and upper as compared with the lower halves of a second area generally surrounding the input pixel, and
   adding the integrated and edge enhancement values calculated in the first and second steps to produce an edge enhanced gray scale output.

7. The method of claim 6 wherein said first area is a seven by nine pixel area and wherein the summation of these first area binary values produces a six bit per pixel value.

8. The method of claim 7 wherein said second area is a six by seven pixel area, six rows being used when calculating a vertical rate of color change, six columns being used when calculating a horizontal rate of color change.

* * * * *

UNITED STATES PATENT AND TRADEMARK OFFICE
Certificate

Patent No. 4,259,694                      Patented March 31, 1981

Henry H. Liad

Application having been made by Henry H. Liad, the inventor named in the patent above identified, and Xerox Corp., Stamford, Conn., a corporation of N.Y., the assignee, for the issuance of a certificate under the provisions of Title 35, Section 256, of the United States Code, adding the name of Hsieh S. Hou as a joint inventor, and a showing and proof of facts satisfying the requirements of the said section having been submitted, it is this 8th day of Feb. 1983, certified that the name of the said Hsieh S. Hou is hereby added to the said patent as a joint inventor with the said Henry H. Liad.

Fred W. Sherling,
*Associate Solicitor.*